US012795586B2

(12) United States Patent
Zhang et al.

(10) Patent No.: US 12,795,586 B2
(45) Date of Patent: Nov. 10, 2026

(54) POSITIONING METHOD AND APPARATUS, DEVICE, AND MEDIUM

(71) Applicant: GUANGDONG OPPO MOBILE TELECOMMUNICATIONS CORP., LTD., Dongguan (CN)

(72) Inventors: Boyuan Zhang, Dongguan (CN); Qianxi Lu, Dongguan (CN); Cong Shi, Dongguan (CN); Yang Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 290 days.

(21) Appl. No.: 18/397,578

(22) Filed: Dec. 27, 2023

(65) Prior Publication Data

US 2024/0129882 A1 Apr. 18, 2024

Related U.S. Application Data

(63) Continuation of application No. PCT/CN2021/105848, filed on Jul. 12, 2021.

(51) Int. Cl.

| | |
|---|---|
| ***H04W 64/00*** | (2009.01) |
| ***H04B 17/318*** | (2015.01) |
| ***H04L 5/00*** | (2006.01) |
| ***H04W 76/20*** | (2018.01) |

(52) U.S. Cl.

CPC .......... *H04W 64/00* (2013.01); *H04B 17/328* (2023.05); *H04L 5/0051* (2013.01); *H04W 76/20* (2018.02)

(58) Field of Classification Search

CPC .... H04W 64/00; H04W 76/20; H04B 17/328; H04L 5/0051

See application file for complete search history.

(56) References Cited

U.S. PATENT DOCUMENTS

| | | | | |
|---|---|---|---|---|
| 2019/0239181 | A1* | 8/2019 | Gangakhedkar | H04W 76/10 |
| 2021/0377906 | A1* | 12/2021 | Bao | G01S 5/0205 |
| 2022/0279581 | A1* | 9/2022 | Baek | H04W 64/00 |
| 2023/0254838 | A1* | 8/2023 | Kim | H04L 5/00 370/329 |

(Continued)

FOREIGN PATENT DOCUMENTS

| | | |
|---|---|---|
| CN | 101868023 A | 10/2010 |
| CN | 107734687 A | 2/2018 |

(Continued)

OTHER PUBLICATIONS

International Search Report and Written Opinion dated Apr. 7, 2022 in International Application No. PCT/CN2021/105848. English translation attached.

(Continued)

*Primary Examiner* — Kenneth T Lam

(74) *Attorney, Agent, or Firm* — Sheppard, Mullin, Richter & Hampton LLP

(57) ABSTRACT

The present disclosure discloses a positioning method and apparatus, a device, and a medium, and relates to the technical field of communications. The positioning method includes: determining, by a terminal, a first anchor entity. The first anchor entity is configured to transmit a positioning reference signal (PRS)

17 Claims, 6 Drawing Sheets

(56) References Cited

U.S. PATENT DOCUMENTS

| | | | | |
|---|---|---|---|---|
| 2024/0061068 | A1* | 2/2024 | Manolakos | H04L 5/0048 |
| 2024/0089909 | A1* | 3/2024 | He | H04W 4/44 |
| 2024/0118370 | A1* | 4/2024 | Duan | G01S 1/042 |
| 2024/0215054 | A1* | 6/2024 | Haustein | H04W 4/20 |

FOREIGN PATENT DOCUMENTS

| | | | |
|---|---|---|---|
| CN | 109842956 | A | 6/2019 |
| CN | 111818558 | A | 10/2020 |
| CN | 112789912 | A | 5/2021 |
| WO | 2019160546 | A | 8/2019 |

OTHER PUBLICATIONS

Qualcomm Incorporated, "Discussion on NR sidelink relay selection and reselection", 3GPP TSG RAN WG2 Meeting #111-e R2-2006557,Aug. 7, 2020.

ZTE Corporation, Sanechips, "Discussion on relay initiation and relay UE (re-)selection" 3GPP TSG-RAN WG2 Meeting #111-e R2-2006736 ,Aug. 7, 2020.

Fraunhofer HHI, Fraunhofer IIS,"L2 vs L3—Relay (re-)Selection, Quality of Service (Qos)", 3GPP TSG RAN WG2 #111-e R2-2006639, Aug. 6, 2020.

OPPO,"Discussion on SL relay (re)selection and authorization", 3GPP TSG-RAN WG2 #111-e R2-2006770,Aug. 7, 2020.

* cited by examiner

POSITIONING METHOD AND APPARATUS, DEVICE, AND MEDIUM

CROSS-REFERENCE TO RELATED APPLICATIONS

This application is a continuation of International Application No. PCT/CN2021/105848 filed on Jul. 12, 2021, and entitled "POSITIONING METHOD AND APPARATUS, DEVICE, AND MEDIUM", the entire contents of which are incorporated herein by reference.

FIELD

The present disclosure relates to the technical field of communications, and more particularly, to a positioning method and apparatus, a device, and a medium.

BACKGROUND

A positioning service is one of indispensable services in daily life. A positioning technology based on radio technology is widely used.

In the related art, a positioning reference signal (PRS) is transmitted by a network device in a mobile communication system, and a terminal positions its own position based on the PRS transmitted by the network device.

However, in a communication scenario based on a sidelink (SL), how the terminal performs positioning based on the SL is a technical problem to be studied.

SUMMARY

Embodiments of the present disclosure provide a positioning method and apparatus, a device, and a medium, which allows a terminal to realize positioning in an SL communication scenario. The technical solution are as follows.

According to an aspect of the present disclosure, a positioning method is provided. The method includes determining, by a terminal, a first anchor entity for transmitting a positioning reference signal (PRS).

According to an aspect of the present disclosure, a terminal is provided. The terminal includes: a processor; and a memory storing at least one program code therein. The at least one program code, when loaded and executed by the processor, implements the positioning method as described above.

According to an aspect of the present disclosure, a network device is provided. The network device includes: a processor; and a memory storing at least one program code therein. The at least one program code, when loaded and executed by the processor, implements a positioning method including configuring, by the network device to a terminal, a first anchor entity for transmitting a positioning reference signal (PRS); or configuring, by the network device, a first anchor entity list to the terminal, the first anchor entity list including a first candidate anchor entity; receiving, by the network device, anchor information of the first candidate anchor entity reported by the terminal, the anchor information of the first candidate anchor entity being measured by the terminal; and configuring, by the network device, a second anchor entity list to the terminal, the second anchor entity list including at least one second candidate anchor entity for determining the first anchor entity.

BRIEF DESCRIPTION OF THE DRAWINGS

In order to clearly explain technical solutions according to the embodiments of the present disclosure, drawings used in the description of the embodiments are briefly described below. Obviously, the drawings described below are merely some embodiments of the present disclosure. Based on these drawings, other drawings can be obtained by those skilled in the art without creative effort.

DETAILED DESCRIPTION

In order to make the objects, technical solutions, and advantages of the present disclosure more apparent, implementations of the present disclosure will be further described in detail below in combination with accompanying drawings.

Figure 1:
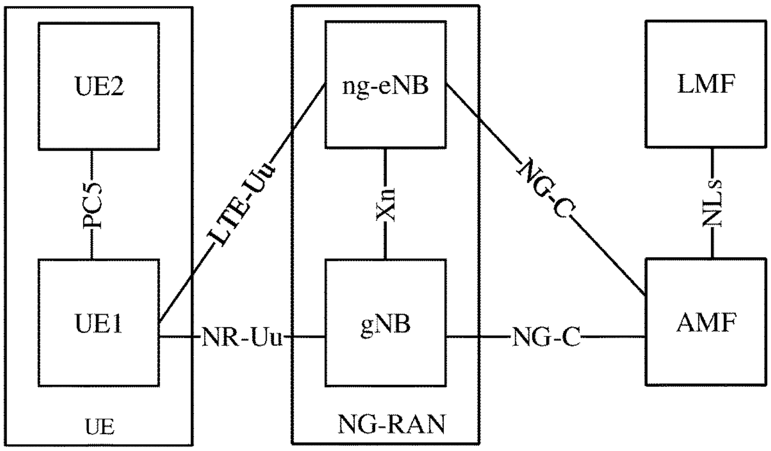
FIG. 1 is a schematic diagram of a communication system according to an exemplary embodiment of the present disclosure.

FIG. 1 is a schematic diagram showing an architecture of a communication system according to an exemplary embodiment of the present disclosure. The system architecture includes a terminal and a network device. As an example, the following takes the terminal as a user equipment (UE) and the network device as a next generation-radio access network (NG-RAN). Optionally, the architecture of the system further includes a location management function (LMF) and an access and mobility management function (AMF), which are specifically described below.

The UE is an entrance for a mobile user to interact with a network, which can provide basic computing and storage capabilities, display a service window to the user, and accept user operation input. The UE uses a next generation air interface technology to establish a signal connection and a data connection with the NG-RAN, thereby transmitting a control signal and service data to a mobile network. Links on a sidelink (SL) may be realized between UEs through a PC5 interface. Links and communications on the SL may be achieved between different UEs by using the PC5 interface. For example, communications between UE1 and UE2 are performed through an SL based on the PC5 interface.

The NG-RAN includes an upgraded next generation-evolved Node B (ng-eNB) and a next generation-NodeB (gNB). The ng-eNB is a network element of the NG-RAN, which may provide a measurement result for position estimation, perform wireless signal measurement for a target UE, and transmit these measurement results to the LMF. The ng-eNB performs its measurements in response to a request from the LMF (as needed or periodically). The ng-eNB may serve a plurality of TPs, including, for example, a remote radio head and a PRS-based terrestrial beacon system (TBS) positioning where only a positioning reference signal (PRS) is used for an evolving-universal terrestrial radio access (E-UTRA). The gNB is a network element of the NG-RAN, which may provide measurement information for the target UE and transmit the information to the LMF.

It should be noted that the gNB and the ng-eNB may not always exist concurrently. When both the gNB and the ng-eNB are present, only one of NG-C interfaces exists. Exemplarily, the UE is connected to the gNB by means of a new radio-user equipment (NR-Uu) interface. The NR-Uu interface is one of several transmission links of an LTE positioning protocol of the target UE having an access to an NR of the NG-RAN. Exemplarily, the UE is connected to the ng-eNB through a long term evolution-user equipment (LTE-Uu) interface. The LTE-Uu interface is one of several transmission links of an LTE positioning protocol.

The LMF is used for managing support of different position services for the target UE which includes positioning of the UE and transmission of assistance data to the UE. The LMF may interact with a service gNB or a service ng-eNB for the target UE to obtain position measurements of the UE. These measurements include uplink measurements performed by the ng-eNB and downlink measurements provided by the UE to the ng-eNB. An evolved Node B (eNB) serves as a part of other functions, e.g., to support handover. The LMF may interact with the target UE to transmit the assistance data when requesting a particular position service or obtain the position estimation if requested.

The AMF is configured to receive, from another entity, a request for some position services associated with a particular target UE, or the AMF itself decides to initiate some position services (e.g., used for IMS emergency calls from the particular target UE) on behalf of the particular target UE. The AMF then transmits a position service request to the LMF. The LMF processes the position service request, which may include transmitting the assistance data to the target UE to assist in positioning based on the UE and/or positioning assisted by the UE and/or may include positioning of the target UE. Then, when the LMF returns a result of the position service to a position service requested by the AMF, the AMF returns the result of the position service to the entity.

Figure 2:
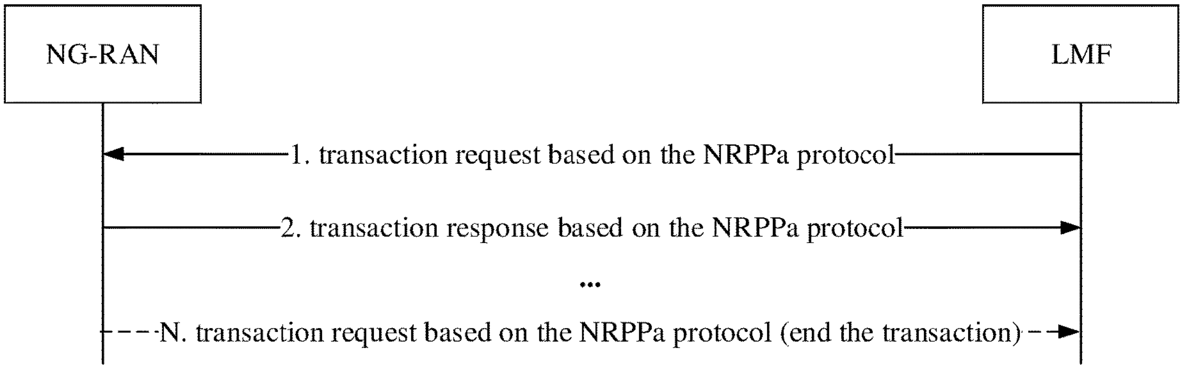
FIG. 2 is a flowchart of node interaction according to an exemplary embodiment of the present disclosure.

In the communication system illustrated in FIG. 1, in order to realize positioning of the terminal, positioning and data collection transactions between an LMF node and an NG-RAN node may be modeled through a process using an NRPPa protocol. As illustrated in FIG. 2, an interaction process of the two nodes is specifically described below.

In step 1, the LMP transmits a transaction request based on the NRPPa protocol to the NG-RAN.

In step 2, the NG-RAN transmits a transaction response based on the NRPPa protocol to the LMP.

. . .

In step N, the LMP transmits the transaction request based on the NRPPa protocol to the NG-RAN to end the transaction.

Exemplarily, provided are two NRPPa steps.

A first NRPPa step is a UE-related step, i.e., is used for information transmission for a specific UE, including a step of supporting a positioning information transmission function and an e-CID position information transmission function.

A second NRPPa step is a non-UE-related step, i.e., is applicable to information transmission of the NG-RAN node and an associated TRP, including steps of supporting an OTDOA information transmission function, an auxiliary information transmission function, a TRP information transmission function, and a measurement information transmission function.

Here, the UE illustrated in FIG. 1 is merely an example of the terminal, and the NG-RAN illustrated in FIG. 1 is only an example of a network device. Exemplarily, the terminal may be a vehicle or other mobile device. Exemplarily, the network device may be a base station that is an apparatus for providing the terminal with a wireless communication function. The base station may include macro base stations, micro base stations, relay stations, access points, and the like in various forms. In a system using different radio access technologies, a device with a base station function may have different names. For example, in an LTE system, the device with the base station function is referred to as an eNodeB or an eNB; and in a 5G NR-U system, the device with the base station function is referred to as a gNodeB or a gNB. With the evolution of communication technology, this description of the "base station" may change. In the embodiments of the present disclosure, the apparatus for providing the terminal with the wireless communication function is collectively referred to as the network device.

Based on the communication system illustrated in FIG. 1, as an example, the communication system includes the terminal, or the communication system includes the terminal and the network device. The present disclosure specifically sets forth a detailed description of a positioning method.

Figure 3:
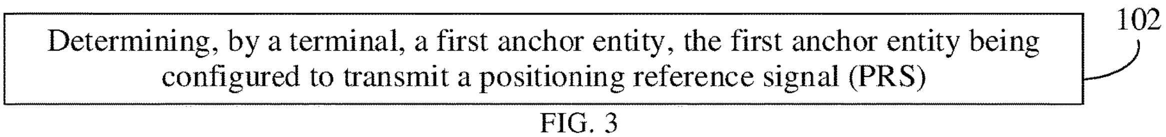
FIG. 3 is a flowchart of a positioning method according to an exemplary embodiment of the present disclosure.

FIG. 3 shows a flowchart of a positioning method according to an exemplary embodiment of the present disclosure. The positioning method is applied in the communication system illustrated in FIG. 1. The communication system includes the terminal. The positioning method provided according to the embodiment of the present disclosure includes actions as follows.

At block S102, a first anchor entity is determined by a terminal.

Exemplarily, the first anchor entity is configured to transmit the PRS.

Here, an anchor entity is configured to provide the terminal with a service related to positioning in an SL communication scenario, or the anchor entity is an entity that provides absolute position information or relative position information during positioning. Exemplarily, the anchor entity refers to other communication devices located around the terminal, including but not limited to at least one of: the network device, other terminals, and a road side unit (RSU).

Here, the RSU refers to an apparatus mounted at the roadside and may realize at least one of: a positioning function for itself, a positioning function for the terminal, and a communication function with the terminal. Optionally, when the RSU realizes communication with the terminal, the RSU is at least configured to transmit the PRS to the terminal.

In addition, the anchor entity may be mobile or fixed.

Exemplarily, the first anchor entity refers to other communication devices located within a predetermined communication range of the terminal at a certain moment.

Here, a number of the first anchor entities may be set as actually needed, which is not limited in the present disclosure. For example, the number of the first anchor entities is determined by the terminal on the basis of actual situations; for another example, the number of the first anchor entities is predetermined by the network device for the terminal.

Figure 4:
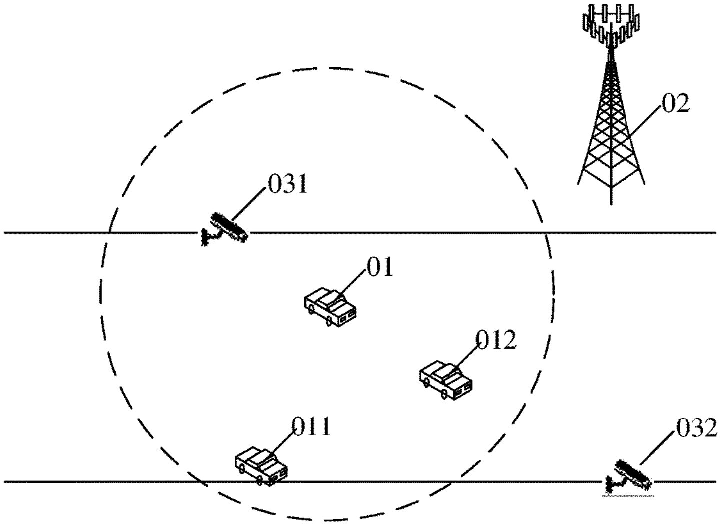
FIG. 4 is a schematic diagram of an implementation scenario according to an exemplary embodiment of the present disclosure.

Referring to FIG. 4, as an example, a first terminal 01 determines the first anchor entity. The first terminal 01 moves at a constant speed towards a right side in the drawing, and a dashed circle is a predetermined communication range of terminal 01 at a certain moment. Specifically, the network device is an access network device 02. The other terminals include a second terminal 011 and a third terminal 012. Moreover, the RSU includes a first RSU 031 and a second RSU 032.

Here, the access network device 02 is a fixed device far away from a road. The second terminal 011 is a vehicle temporarily parked on the roadside. The third terminal 012 is a vehicle moving rightwards and accelerating at a different speed from the first terminal 01. In addition, the first RSU 031 and the second RSU 032 are devices fixed on two sides of the road. In this case, since the second terminal 011, the third terminal 012, and the first RSU 031 are located within the predetermined communication range of the terminal 01, the first anchor entity determined by the first terminal 01 includes at least one of the second terminal 011, the third terminal 012, and the first RSU 031.

Subsequently, in a process where the first terminal 01 moves rightwards at a constant speed, the predetermined communication range of the first terminal 01 is also changing. In a possible case, the second terminal 011 and the first RSU 031 will gradually exit the predetermined communication range of the first terminal 01, and the access network device 02 and the second RSU 032 will gradually enter the predetermined communication range of the first terminal 01. In this case, the first anchor entity determined by the first terminal 01 includes at least one of the third terminal 012, the access network device 02, and the second RSU 032.

Exemplarily, a process of determining the first anchor entity by the terminal may be autonomously selected by the terminal or determined based on configuration of the network device. The autonomous selection of the terminal may be performed by the terminal based on a set selection policy. Specifically, the selection policy may be set by the terminal or configured by the network device for the terminal. The present disclosure does not limit this.

For example, the terminal receives a first anchor entity configured by the network device; for another example, the terminal autonomously selects the first anchor entity; and for another example, the terminal receives an anchor entity list configured by the network device. The anchor entity list is used to determine the first anchor entity.

At block 102, after determining the first anchor entity, the terminal may implement its own positioning based on the PRS transmitted by the first anchor entity. The measurement of the PRS may be performed by the terminal or a network device serving the terminal. Specifically, a basic signal measured for a terrestrial positioning method is usually long term evolution (LTE) radio transmission or New Radio (NR) radio transmission. Other methods may utilize other transmissions like general radio navigation signals; for example, a global navigation satellite system signal is utilized.

In an optional embodiment, the terminal may accomplish its own positioning based on the PRS transmitted by the first anchor entity and a corresponding positioning scheme. A description of the positioning scheme may be made below.

In summary, in the positioning method provided in the embodiments of the present disclosure, by determining the first anchor entity, the terminal may determine its own position based on the PRS transmitted by the first anchor entity, allowing the terminal to achieve positioning in the SL communication scenario.

According to the foregoing, the process by which the terminal determines the first anchor entity may be autonomously selected by the terminal or determined based on the configuration of the network device. Exemplarily, provided are various implementations for the terminal of determining the first anchor entity. At least three optional implementations are provided below according to the embodiments of the present disclosure.

In implementation 1, the terminal receives the first anchor entity configured by the network device.

In implementation 2, the terminal autonomously selects the first anchor entity.

In implementation 3, the terminal receives the anchor entity list configured by the network device. The anchor entity list is used to determine the first anchor entity.

In an optional embodiment, the terminal needs to determine the first anchor entity once, and any of the three aforementioned implementations may optionally be performed. The present disclosure does not impose any restrictions on which implementation to use. Alternatively, in another optional implementation scenario, the terminal needs to determine the first anchor entity multiple times. The same or different implementations can be used during $i_{th}$ determination and $(i+1)_{th}$ determination, and the present disclosure does not limit this.

Exemplarily, in the following embodiments, a step of the terminal may become an embodiment of the positioning method alone, and a step of the network device may also be solely an embodiment of the positioning method. For an elaborate depiction of the steps involved in the positioning method, please refer to the following details.

Specifically, the three implementations are described in detail below.

In implementation 1, the terminal receives the first anchor entity configured by the network device.

Figure 5:
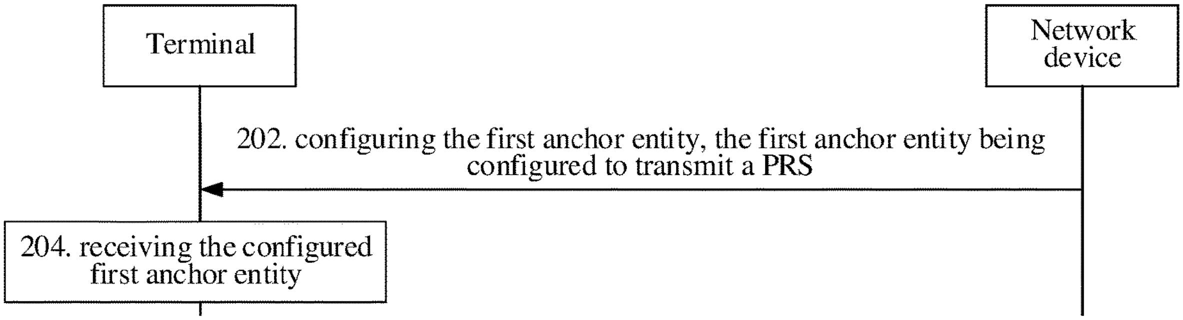
FIG. 5 is a flowchart of a positioning method according to an exemplary embodiment of the present disclosure.

FIG. 5 illustrates a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 202, the network device configures the first anchor entity to the terminal.

Exemplarily, the first anchor entity is configured to transmit the PRS.

Optionally, the first anchor entity may be carried in signaling such as at least one of radio resource control (RRC), downlink control information (DCI), and media access control control element (MAC CE).

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Here, the anchor entity may be mobile or fixed.

Exemplarily, the first anchor entity refers to other communication devices located within the predetermined communication range of the terminal at a certain moment. The number of the first anchor entities may be set as actually needed, which is not limited in the present disclosure.

For descriptions of the anchor entity and the first anchor entity, reference may be made to the foregoing, and details are omitted herein.

Optionally, block 202 may be implemented as a step of: when the terminal is within a cell coverage of the network device and in an RRC connected state, configuring, by the network device, the first anchor entity to the terminal.

At block 204, the terminal receives the first anchor entity configured by the network device.

According to block 202, since the network device configures the first anchor entity to the terminal, the terminal may obtain the first anchor entity configured by the network device based on this.

According to the previous content, block 204 may further be implemented as a step of: when the terminal is within a cell coverage of the network device and in a radio resource control (RRC) connected state, receiving, by the terminal, the first anchor entity configured by the network device.

Optionally, after the first anchor entity is determined, the terminal may measure the PRS transmitted by the first anchor entity to obtain measurement information for positioning.

Exemplarily, the measurement information includes but is limited to at least one of: a reference signal received power (RSRP) measurement value of the first anchor entity; a reference signal receiving quality (RSRQ) measurement value of the first anchor entity; a relative speed between the terminal and the first anchor entity; a positioning source of the first anchor entity; a positioning source priority level of the first anchor entity; an identifier of an alternative anchor entity; an RSRP measurement value of the alternative anchor entity; an RSRQ measurement value of the alternative anchor entity; a relative speed between the terminal and the alternative anchor entity; a positioning source of the alternative anchor entity; and a positioning source priority level of the alternative anchor entity.

Here, the RSRP measurement value and the RSRQ measurement value of the first anchor entity vary depending on a type of the first anchor entity. When the first anchor entity is the network device or the RSU, the RSRP measurement value of the first anchor entity is a measurement value corresponding to a Uu interface, and the RSRQ measurement value of the first anchor entity is the measurement value corresponding to the Uu interface. When the first anchor entity is another terminal, the RSRP measurement value of the first anchor entity is a measurement value corresponding to the SL, and the RSRQ measurement value of the first anchor entity is the measurement value corresponding to the SL. Optionally, the links on the SL is realized between the two terminals by means of the PC5 interface. Correspondingly, the RSRP measurement value and the RSRQ measurement value of the alternative anchor entity are similar to the first anchor entity, to which reference may be made. No further elaboration is provided.

Optionally, the positioning source includes at least one of: the terminal, the network device, the RSU, and a global navigation positioning system.

Optionally, the alternative anchor entity belongs to candidate anchor entities, and the identifier of the alternative anchor entity includes at least one of: a cell global identifier (CGI)) and a destination address (Destination ID). The CGI includes at least one of an E-UTRAN cell global identifier (ECGI) and an NR cell global identifier (NCGI).

Specifically, the terminal may determine its own position based on one or more of the above measurement information.

In implementation 2, the terminal autonomously selects the first anchor entity.

Figure 6:
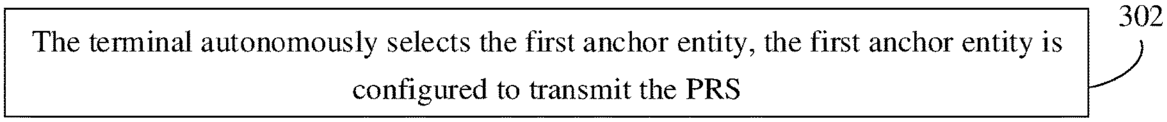
FIG. 6 is a flowchart of a positioning method according to an exemplary embodiment of the present disclosure.

FIG. 6 shows a flowchart of a positioning method according to an exemplary embodiment of the present disclosure. The positioning method is applied in the communication system illustrated in FIG. 1. The communication system includes the terminal. The positioning method provided in the embodiment of the present disclosure includes actions as follows.

At block 302, the terminal autonomously selects the first anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to at least one of: the network device, other terminals, and the RSU.

Exemplarily, the first anchor entity refers to other communication devices located within the predetermined communication range of the terminal at a certain moment.

For the descriptions of the anchor entity and the first anchor entity, reference may be made to the foregoing, and details are omitted herein.

Here, the autonomous selection of the terminal may be performed by the terminal based on the set selection policy. Specifically, the selection policy may be set by the terminal or configured by the network device for the terminal. The present disclosure does not limit this.

For example, the anchor entity located around a first terminal includes an immovable RSU and a network device far from the first terminal. After the first terminal obtains the two anchor entities, since an RSRP measurement value of the immovable RSU is higher than an RSRP measurement value of the network device, the terminal preferentially selects the RSU as the first anchor entity.

For another example, the anchor entity located around the first terminal includes the immovable RSU and a second terminal, and the second terminal moves in the same direction as the first terminal. After the first terminal obtains the two anchor entities, the first terminal preferentially selects the second terminal as the first anchor entity.

Optionally, block 302 may be implemented as a step of: when the terminal is outside a cell coverage of a network device, selecting autonomously, by the terminal, the first anchor entity; or when the terminal is in an RRC idle state or an RRC inactive state, selecting autonomously, by the terminal, the first anchor entity.

Optionally, after the first anchor entity is determined, the terminal may measure the PRS transmitted by the first anchor entity to obtain measurement information for determining positioning. The content related to the measurement information may refer to the foregoing, and details are omitted herein.

In implementation 3, the terminal receives the anchor entity list configured by the network device. The anchor entity list is used to determine the first anchor entity.

Figure 7:
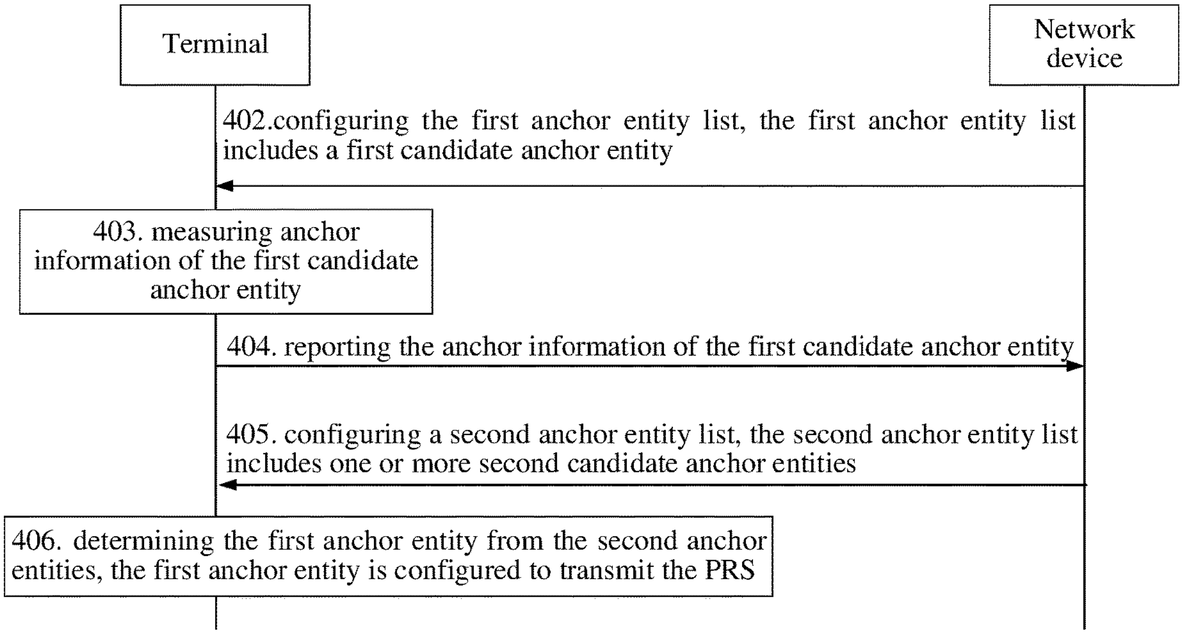
FIG. 7 is a flowchart of a positioning method according to an exemplary embodiment of the present disclosure.

FIG. 7 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 402, the network device configures the first anchor entity list to the terminal.

Exemplarily, the first anchor entity list includes a first candidate anchor entity.

Here, the first anchor entity list includes at least one anchor entity, and a number of the anchor entities may be set as actually needed, which is not limited in the present disclosure.

At block 403, the terminal measures anchor information of the first candidate anchor entity.

According to block 402, the terminal may obtain the first anchor entity list configured by the network device. Subsequently, the terminal may measure the anchor information of the first candidate anchor entity.

Exemplarily, the anchor information of the first candidate anchor entity includes at least one of: a type of the first candidate anchor entity; an identifier of the first candidate anchor entity; a movement direction of the first candidate anchor entity; a movement speed of the first candidate anchor entity; a reference signal received power (RSRP) measurement value of the first candidate anchor entity; a reference signal receiving quality (RSRQ) measurement value of the first candidate anchor entity; and a relative speed between the terminal and the first candidate anchor entity.

According to the foregoing, the anchor entity includes, but is not limited to, at least one of: the network device, other terminals, and the RSU. Based on this, the type of the first candidate anchor entity means that the first candidate anchor entity belongs to one of the network device, other terminals, and the RSU.

In addition, determination of a movement direction of the first candidate anchor entity should be based on the terminal.

At block 404, the terminal reports the anchor information of the first candidate anchor entity to the network device.

Here, the anchor information of the first candidate anchor entity may refer to the above content, and details are omitted herein.

At block 405, the network device configures a second anchor entity list to the terminal.

Exemplarily, the second anchor entity list includes one or more second candidate anchor entities.

Here, the anchor entity(ies) in the second anchor entity list is one, or more, or all anchor entities in the first anchor entity list. Optionally, the second anchor entity list is a subset of the first anchor entity list, and the second anchor entity list includes part of anchor entities in the first anchor entity list.

A determination rule of the anchor entity included in the second anchor entity list may be determined as actually needed.

For example, the anchor entity included in the second anchor entity list has a higher RSRP measurement value than a first predetermined threshold or a higher RSRQ measurement value than a second predetermined threshold. For another example, the anchor entity included in the second anchor entity list has the same movement direction as the terminal. For another example, the anchor entity included in the second anchor entity list is a fixed communication device. For another example, the anchor entity included in the second anchor entity list has the RSRP measurement value higher than the first predetermined threshold and has the same movement direction as the terminal. For another example, the anchor entity included in the second anchor entity list has the RSRQ measurement value higher than the second predetermined threshold and is the fixed communication device.

Specifically, after the network device obtains the anchor information of the first candidate anchor entity, the network device screens the first anchor entity list as actually needed, thereby obtaining the second anchor entity list, and distributing the second anchor entity list to the terminal.

For example, the first anchor entity list includes an anchor entity 1, an anchor entity 2, an anchor entity 3, and an anchor entity 4. The terminal reports anchor movement directions of the four anchor entities to the network device. The anchor entity 1 has an opposite movement direction to the terminal, and the anchor entity 2, the anchor entity 3, and the anchor entity 4 has the same movement direction as the terminal. Based on this, the network device configures the second anchor entity list to the terminal. The second anchor entity list includes the anchor entity 2, the anchor entity 3, and the anchor entity 4.

At block 406, the terminal determines the first anchor entity from the second anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Exemplarily, the first anchor entity refers to other communication devices located within the predetermined communication range of the terminal at a certain moment.

For the descriptions of the anchor entity and the first anchor entity, reference may be made to the foregoing, and details are omitted herein.

Specifically, after obtaining the second anchor entity list, the terminal may autonomously select the first anchor entity or determine the first anchor entity based on the set selection policy. Specifically, the selection policy may be set by the terminal or configured by the network device for the terminal. The present disclosure does not limit this.

In an optional embodiment, after obtaining the second anchor entity list, there is a possibility of failure of autonomously selecting the first anchor entity.

Based on this, the embodiments of the present disclosure optionally include a step of: when the first anchor entity fails to be autonomously selected, transmitting, by the terminal, a third request to a network device. The third request is configured to reconfigure the second anchor entity list.

Optionally, after determining the first anchor entity, the terminal may measure the PRS transmitted by the first anchor entity to obtain the measurement information for determining positioning. The content related to the measurement information may refer to the foregoing, and details are omitted herein.

In summary, in the embodiments of the present disclosure, three optional implementations of the terminal for determining the first anchor entity are provided. Specifically, the terminal may autonomously select the first anchor entity or determine the first anchor entity according to the configuration of the network device.

According to the foregoing, the terminal may implement its own positioning based on the PRS transmitted by the first anchor entity and a first positioning scheme.

Exemplarily, the positioning scheme includes at least one of: a network-assisted global navigation satellite system method; LTE signal-based time difference of arrival positioning; an LTE signal-based enhanced cell identification method; wireless local area network positioning; Bluetooth positioning; terrestrial beacon systems (TBS) positioning; a sensor-based method including an air pressure sensor and a motion sensor; an NR signal-based NR enhanced-cell identification (NRe-CID); round trip time (RTT) positioning, including NR signal-based multi-RTT; an NR signal-based downlink-angle of departure (DL-AoD); an NR signal-based downlink-time difference of arrival (DL-TDOA); an NR signal-based uplink-time difference of arrival (UL-TDOA); and an uplink-time of arrival (UL-AoA), including NR signal-based A-AoA and Z-AoA.

Exemplarily, one of the above positioning schemes may be used for positioning the terminal. For example, the terminal uses one of the above positioning schemes to perform autonomous positioning without assistance of the network device; or a plurality of the above positioning schemes may be used in combination to implement hybrid positioning.

As an example, the communication system in FIG. 1 further includes the LMF. For the positioning of the terminal, the LMP determines a positioning method to be used based on factors that may include a live communications server (LCS) client type, required quality of service (QoS), a positioning capability of the terminal, and a device positioning capability of the network; afterwards, the LMF invokes these positioning methods in the terminal to serve the network device. The positioning method may generate position estimation for a terminal-based positioning method and/or positioning measurements for a terminal-assisted network-based positioning method. The LMF may combine all received results and determine a single position estimation for a target terminal to achieve hybrid positioning, and may also determine additional information such as position estimation accuracy and speed.

An LTE positioning protocol (LPP) terminates between the terminal and a positioning server. Exemplarily, the LPP terminates between the terminal under a control plane condition and an LMF under the control plane condition. Alternatively, the LPP terminates between a terminal arranged under a user plane condition and a service location protocol (SLP) under the user plane condition. Optionally, the LP may use a control layer protocol or a user plane protocol as underlying transmission.

Exemplarily, an LPP message is transmitted as a transparent protocol data unit (PDU) through an intermediate network interface according to an appropriate protocol, like according to NGAP on the NG-C interface, NAS/RRC on the LTE Uu interface and the NR Uu interface. The LPP protocol aims to realize the positioning of NR and LTE by using diverse position methods, while keeping details of any specific positioning method and details of the underlying transmission isolated from each other.

Here, the protocol operates on the basis of transactions between the terminal and a server, with each transaction performed as an independent process. At any given time, more than one such procedure may be in progress. An LPP process may involve a request/response pairing of a message or a request/response pairing of one or more "unrequested" messages. Each process has a single object, for example, to transmit assistance data according to some QoS, exchange LPP-related capabilities, or position target devices according to some QoS and use one or more positioning methods. The LPP process may use a plurality of procedures in series and/or in parallel to achieve more sophisticated objects, like positioning of a target device associated with assistance data transmission and exchanging with the LPP-related capabilities. In addition, a plurality of steps also allows a plurality of positioning attempts to be simultaneously performed. For example, coarse position estimation is obtained with a low delay while accurate position estimation is obtained with a high delay.

By taking determination of the first positioning scheme as an example, the embodiments of the present disclosure provide at least two optional implementations as follows.

In implementation 1, the terminal receives the first positioning scheme configured by the network device.

In implementation 2, the terminal autonomously selects the first positioning scheme.

Exemplarily, when the terminal needs to implement its own positioning by means of the first anchor entity and the first positioning scheme, the two implementations for determining the first positioning scheme provided in the embodiments of the present disclosure may be arbitrarily combined with the above three implementations for determining the first anchor entity, to realize the positioning of the terminal, which is not limited in the present disclosure. Specifically, the determination of the first anchor entity and the determination of the first positioning scheme may be completed concurrently or progressively. For the description of the specific steps, reference may be made to the aforementioned content, and details are omitted herein.

The following describes the above two implementations.

In implementation 1, the terminal receives the first positioning scheme configured by the network device.

Figure 8:
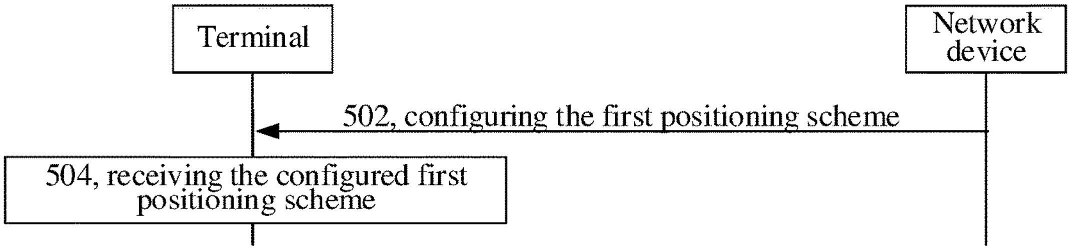
FIG. 8 is a flowchart of a positioning method according to an exemplary embodiment of the present disclosure.

FIG. 8 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 502, the network device configures the first positioning scheme to the terminal.

According to the foregoing, the first positioning scheme includes at least one of: the network-assisted global navigation satellite system method; the LTE signal-based time difference of arrival positioning; the LTE signal-based enhanced cell identification method; the wireless local area network positioning; the Bluetooth positioning; the TBS positioning; the sensor-based method including the air pressure sensor and the motion sensor; the NR signal-based NRe-CID; the RTT positioning; the NR signal-based DL- AoD; the NR signal-based DL-TDOA; the NR signal-based UL-TDOA; and the UL-AoA.

At block 504, the terminal receives the first positioning scheme configured by the network device.

According to block 502, since the network device configures the first positioning scheme to the terminal, the terminal may obtain the first positioning scheme configured by the network device. Subsequently, the terminal may realize its own positioning in conjunction with the first anchor entity.

Optionally, when the first anchor entity is determined by the terminal based on the configuration of the network device, configuration of the first anchor entity or configuration of the first anchor entity list may be performed concurrently or successively with configuration of the first positioning scheme.

Exemplarily, in the embodiments of the present disclosure, the step of the terminal may become an embodiment of the positioning method alone, and the step of the network device may also be solely an embodiment of the positioning method. For the elaborate depiction of the steps involved in the positioning method, please refer to the following details.

In implementation 2, the terminal autonomously selects the first positioning scheme.

Figure 9:
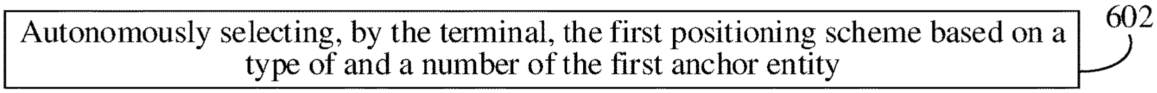
FIG. 9 is a flowchart of a positioning method according to an exemplary embodiment of the present disclosure.

FIG. 9 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 602, the terminal autonomously selects the first positioning scheme based on a type of and a number of the first anchor entity.

As described above, the anchor entity includes, but is not limited to, the at least one of: the network device, other terminals, and the RSU. Based on this, the type of the first anchor entity means that the first anchor entity belongs to the one of the network device, other terminals, and the RSU.

Exemplarily, the description of the first positioning scheme may refer to the foregoing, and details are omitted herein.

Optionally, the first positioning scheme is a positioning scheme based on a distance difference, and three anchor entities need to be determined; and the first positioning scheme is an angle-based positioning scheme, and at least one anchor entity needs to be determined. The autonomous selection of the terminal may be performed by the terminal according to the set selection policy. Specifically, the selection policy may be configured by the terminal or configured by the network device for the terminal, which is not limited in the present disclosure.

For example, when the first anchor entity is a plurality of vehicles, the terminal may select a positioning scheme as network-assisted global positioning satellite system positioning.

In conclusion, the embodiments of the present disclosure provide two optional implementations for determining the first positioning scheme, enabling the terminal to achieve positioning for itself through the first anchor entity and the first positioning scheme.

In addition, the two implementations for determining the first positioning scheme provided in the embodiments of the present disclosure may be arbitrarily combined with the above three implementations for determining the first anchor entity. For example, the terminal autonomously selects the first anchor entity, and the network device determines the first positioning scheme based on anchor information of a first anchor entity reported by the terminal, and configures the first positioning scheme to the terminal; for another example, the terminal determines the first anchor entity according to the second anchor entity list configured by the network device, and the first positioning scheme is autonomously selected by the terminal based on the type and number of the first anchor entity; and for another example, after autonomously selecting the first anchor entity, the terminal autonomously selects the first positioning scheme based on the type and number of the first anchor entity.

In an optional embodiment, there is a possibility of failure or invalidation in determining the first anchor entity. For example, the first anchor entity is a fixed RSU. When the terminal determines the first anchor entity, a distance between the terminal and the RSU exceeds the predetermined communication range of the terminal because of a fast movement speed of the terminal, resulting in a failure to determine the first anchor entity. For another example, with the movement of the terminal, the first anchor entity is caused to gradually exit the predetermined communication range of the terminal, thereby rendering the first anchor entity invalid.

Based on this, the second anchor entity needs to be reconfigured, in order to realize the positioning of the terminal. Similar to a determination process of the first anchor entity, determination of the second anchor entity may be autonomously selected by the terminal or determined on the basis of the configuration of the network device. Exemplarily, in the embodiments of the present disclosure, the reconfiguration of the second anchor entity is provided as at least several optional implementations.

In implementation 1, the network device reconfigures the second anchor entity based on measurement information reported by the terminal.

In implementation 2, when the measurement information satisfies a trigger condition, the terminal autonomously selects the second anchor entity.

In addition, in an optional embodiment, a first timer is configured by the network device for the terminal and is configured to indicate an available duration or a valid duration of the first anchor entity. Exemplarily, when the first timer expires, the reconfiguration of the second anchor entity further includes the following optional implementations.

In implementation 3, when the first timer expires, the terminal requests the network device to reconfigure the second anchor entity.

In implementation 4, when the first timer expires, the terminal autonomously selects the second anchor entity.

In an optional embodiment, the terminal needs to determine the second anchor entity once, and any of the four aforementioned implementations may optionally be performed. The present disclosure does not impose any restrictions on which implementation to use. Alternatively, in another optional implementation scenario, the terminal needs to determine the second anchor entity multiple times. The same or different implementations can be used during the $i_{th}$ determination and $(i+1)_{th}$ determination, and the present disclosure does not limit this.

Exemplarily, the four implementations for reconfiguring the second anchor entity given in the embodiments of the present disclosure may be arbitrarily combined with the above three implementations for determining the first anchor entity, to realize determination of the anchor entity, which is not limited in the present disclosure. Alternatively, the four implementations for reconfiguring the second anchor entity provided in the embodiments of the present disclosure may be arbitrarily combined with the above two implementations for determining the first positioning scheme, to realize the positioning of the terminal, which is not limited in the present disclosure.

Exemplarily, in the following embodiments, the step of the terminal may become an embodiment of the positioning method alone, and the step of the network device may also be solely an embodiment of the positioning method. For the elaborate depiction of the steps involved in the positioning method, please refer to the following details.

Specifically, the four implementations are described in detail below.

In implementation 1, the network device reconfigures the second anchor entity based on the measurement information reported by the terminal.

Figure 10:
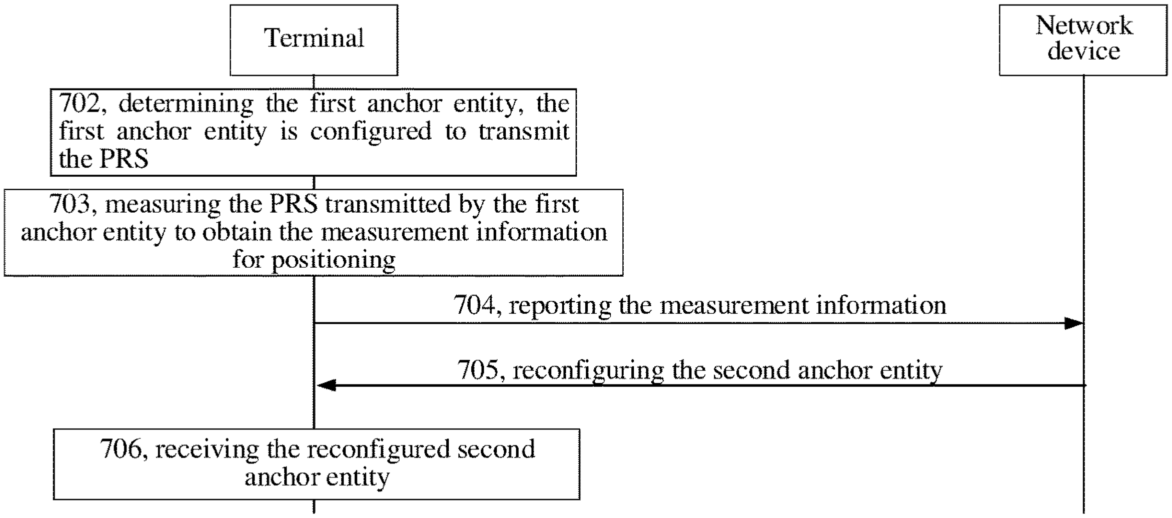
FIG. 10 is a flowchart of a positioning method according to an exemplary embodiment of the present disclosure.

FIG. 10 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 702, the terminal determines the first anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Exemplarily, the first anchor entity refers to other communication devices located within the predetermined communication range of the terminal at a certain moment.

For the descriptions of the anchor entity and the first anchor entity, reference may be made to the foregoing, and details are omitted herein. For the determination of the first anchor entity, reference may be made to the above three implementations, and details are omitted herein.

At block 703, the terminal measures the PRS transmitted by the first anchor entity to obtain the measurement information for positioning.

According to the foregoing, the measurement information includes at least one of: a RSRP measurement value of the first anchor entity; a RSRQ measurement value of the first anchor entity; a relative speed between the terminal and the first anchor entity; a positioning source of the first anchor entity; a positioning source priority level of the first anchor entity; an identifier of an alternative anchor entity; an RSRP measurement value of the alternative anchor entity; an RSRQ measurement value of the alternative anchor entity; a relative speed between the terminal and the alternative anchor entity; a positioning source of the alternative anchor entity; and a positioning source priority level of the alternative anchor entity.

Exemplarily, in an optional implementation scenario, the alternative anchor entity is used by the terminal to redetermine an available anchor entity when the first anchor entity fails to be determined or becomes invalid. For example, the alternative anchor entity is the RSU, and the first anchor entity is the network device. After the distance between the terminal and the network device exceeds the predetermined communication range of the terminal, the RSU enters the predetermined communication range, and the terminal may determine the RSU as the available anchor entity which becomes a new first anchor entity.

At block 704, the terminal reports the measurement information to the network device.

According to block 703, the terminal may obtain the measurement information through measurement; and then, the terminal reports the measurement information to the network device, allowing the network device to obtain the measurement information.

At block 705, the network device reconfigures the second anchor entity to the terminal.

Exemplarily, the second anchor entity is one of the alternative anchor entities. A number of the second anchor entities may be set as actually needed, which is not limited herein.

Specifically, after obtaining the measurement information reported by the terminal, the network device determines the available anchor entity based on the measurement information and reconfigures the available anchor entity to the terminal.

At block 706, the terminal receives the second anchor entity reconfigured by the network device.

For example, the measurement information received by the network device includes a positioning source and a positioning source priority level of the anchor entity 1, a positioning source and a positioning source priority level of the anchor entity 2, and a positioning source and a positioning source priority level of the anchor entity 3. According to the positioning source and the positioning source priority level of each of the three anchor entities, the network device determines that the positioning source priority level of the anchor entity 2 is the highest. Subsequently, the network device reconfigures the anchor entity 2 to the terminal, allowing the anchor entity 2 to become a new available anchor entity of the terminal.

Compared with the first anchor entity, the second anchor entity may also be used to transmit the PRS.

Specifically, after receiving the second anchor entity reconfigured by the network device, the terminal may determine its own position based on the PRS transmitted by the second anchor entity.

In implementation 2, when the measurement information satisfies a trigger condition, the terminal autonomously selects the second anchor entity.

Figure 11:
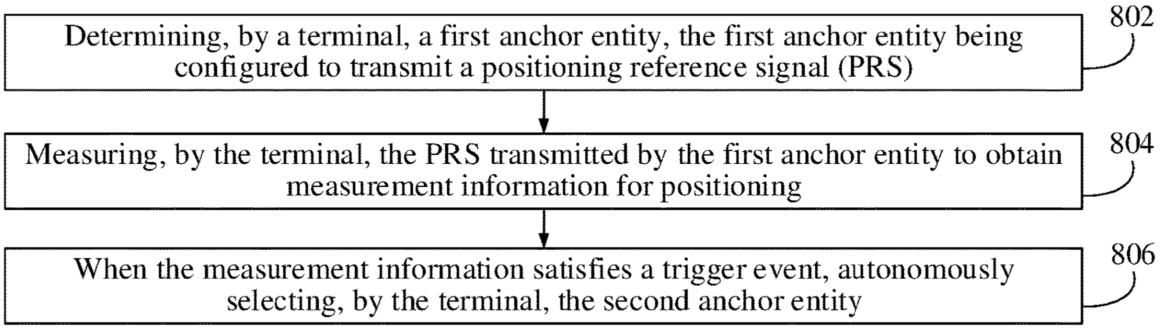
FIG. 11 is a flowchart of a positioning method according to an exemplary embodiment of the present disclosure.

FIG. 11 shows a flowchart of a positioning method according to an exemplary embodiment of the present disclosure. The positioning method is applied in the communication system illustrated in FIG. 1. The communication system includes the terminal. The positioning method provided in the embodiment of the present disclosure includes actions as follows.

At block 802, the terminal determines the first anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Exemplarily, the first anchor entity refers to other communication devices located within the predetermined communication range of the terminal at a certain moment.

Exemplarily, for the descriptions of the anchor entity and the first anchor entity, reference may be made to the foregoing, and details are omitted herein. For the determination of the first anchor entity, reference may be made to the above three implementations, and details are omitted herein.

At block 804, the terminal measures the PRS transmitted by the first anchor entity to obtain the measurement information for positioning.

The content of the measurement information may refer to the above contents, and details are omitted herein.

At block 806, when the measurement information satisfies the trigger event, the terminal autonomously selects the second anchor entity.

Exemplarily, the second anchor entity is one of the alternative anchor entities. A number of the second anchor entities may be set as actually needed, which is not limited herein.

Exemplarily, the trigger event includes at least one of: an RSRP measurement value of the first anchor entity being smaller than an RSRP measurement threshold; an RSRQ measurement value of the first anchor entity being smaller than an RSRQ measurement threshold; a positioning source of the first anchor entity changing; a positioning priority level of the first anchor entity changing; a relative speed between the terminal and the first anchor entity exceeding a speed threshold; and an angle between a movement direction of the terminal and a movement direction of the first anchor entity being greater than a direction threshold.

Here, the RSRP measurement value and the RSRQ measurement value of the first anchor entity vary depending on the type of the first anchor entity. For details, reference may be made to the foregoing. Optionally, the positioning source includes the at least one of: the terminal, the network device, the RSU, and the global navigation positioning system.

Exemplarily, the autonomous selection of the terminal may be performed by the terminal according to the set selection policy. Specifically, the selection policy may be configured by the terminal or configured by the network device for the terminal, which is not limited in the present disclosure.

For example, the measurement information received by the network device includes the RSRP measurement value of the first anchor entity. Since the RSRP measurement value of the first anchor entity is smaller than the RSRP measurement threshold, a signal between the first anchor entity and the network device is weak. Based on this, the measurement information satisfies the trigger event, and the terminal may autonomously select the second anchor entity.

Like the first anchor entity, the second anchor entity may also be used to transmit the PRS.

Specifically, after determining the second anchor entity, the terminal may determine its own position based on the PRS transmitted by the second anchor entity.

As described above, in an optional embodiment, the first timer is configured by the network device for the terminal and is configured to indicate the available duration or the valid duration of the first anchor entity. Exemplarily, when the first timer expires, the reconfiguration of the second anchor entity further includes the following optional implementations.

In implementation 3, when the first timer expires, the terminal requests the network device to reconfigure the second anchor entity.

Figure 12:
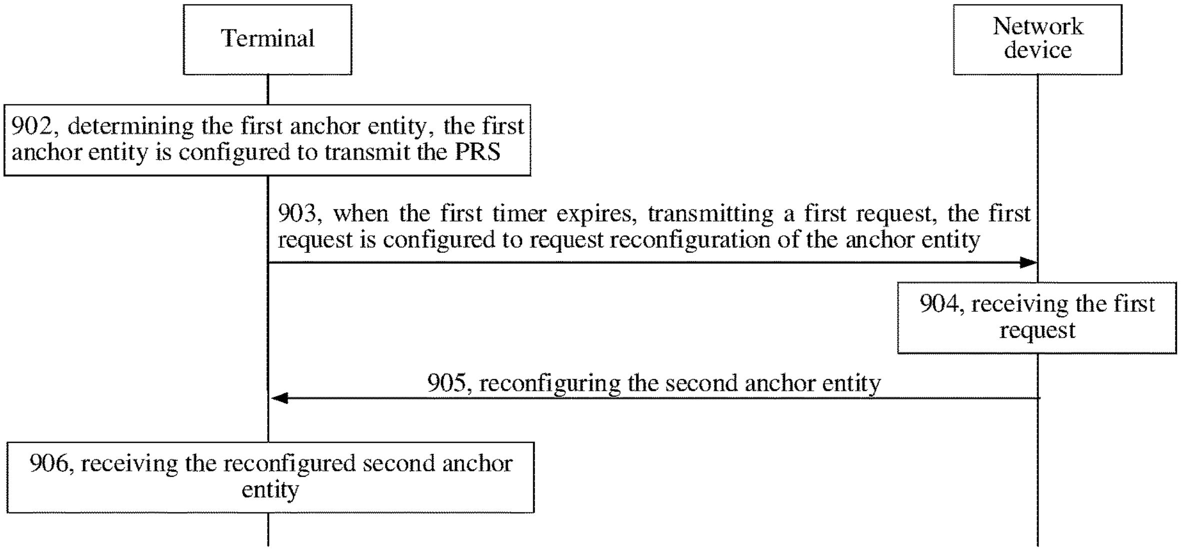
FIG. 12 is a flowchart of a positioning method according to an exemplary embodiment of the present disclosure.

FIG. 12 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 902, the terminal determines the first anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Exemplarily, the first anchor entity refers to other communication devices located within the predetermined communication range of the terminal at a certain moment.

Exemplarily, for the descriptions of the anchor entity and the first anchor entity, reference may be made to the foregoing, and details are omitted herein. For the determination of the first anchor entity, reference may be made to the above three implementations, and details are omitted herein.

At block 903, when the first timer expires, the terminal transmits a first request to the network device.

Exemplarily, the first request is configured to request reconfiguration of the anchor entity.

According to the foregoing, the first timer is used for indicating the available duration or the valid duration of the first anchor entity. That the first timer expires means that the available duration or valid duration of the first anchor entity is exceeded, i.e., the first anchor entity is in an invalid state, and the terminal cannot determine its own position by means of the first anchor entity, or accuracy of position information determined by the terminal through the first anchor entity is lower than a threshold.

Based on this, when the first timer expires, the terminal may request the network device to reconfigure the available anchor entity.

At block 904, the network device receives the first request.

According to the foregoing, the first request is used to request the reconfiguration of the anchor entity.

At block 905, the network device reconfigures the second anchor entity to the terminal.

In response to the first request transmitted by the terminal, the network device selects the available anchor entity and configures the anchor entity to the terminal, enabling the terminal to realize positioning through the anchor entity.

At block 906, the terminal receives the second anchor entity reconfigured by the network device.

According to block 905, because the network device configures the second anchor entity to the terminal, the terminal may obtain the reconfigured second anchor entity.

Like the first anchor entity, the second anchor entity may also be used to transmit the PRS.

Specifically, after receiving the second anchor entity reconfigured by the network device, the terminal may determine its own position based on the PRS transmitted by the second anchor entity.

In implementation 4, when the first timer expires, the terminal autonomously selects the second anchor entity.

Figure 13:
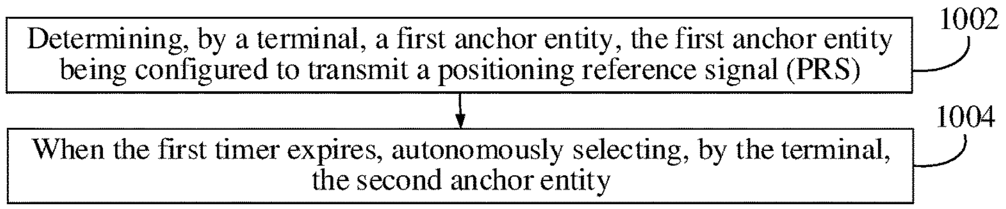
FIG. 13 is a flowchart of a positioning method according to an exemplary embodiment of the present disclosure.

FIG. 13 shows a flowchart of a positioning method according to an exemplary embodiment of the present disclosure. The positioning method is applied in the communication system illustrated in FIG. 1. The communication system includes the terminal. The positioning method provided in the embodiment of the present disclosure includes actions as follows.

At block 1002, the terminal determines the first anchor entity.

Exemplarily, the first anchor entity is configured to transmit the PRS.

Optionally, the first anchor entity may be carried in signaling like the at least one of: RRC, DCI, and MAC CE.

Here, the anchor entity is configured to provide the terminal with the service related to positioning in the SL communication scenario, or the anchor entity is the entity that provides the absolute position information or relative position information during positioning. Exemplarily, the anchor entity refers to other communication devices located around the terminal, including but not limited to the at least one of: the network device, other terminals, and the RSU.

Exemplarily, the first anchor entity refers to other communication devices located within the predetermined communication range of the terminal at a certain moment.

Exemplarily, for the descriptions of the anchor entity and the first anchor entity, reference may be made to the foregoing, and details are omitted herein. For the determination of the first anchor entity, reference may be made to the above three implementations, and details are omitted herein.

At block 1004, when the first timer expires, the terminal autonomously selects the second anchor entity.

According to the foregoing, the first timer is used for indicating the available duration or the valid duration of the first anchor entity. That the first timer expires means that the available duration or valid duration of the first anchor entity is exceeded, i.e., the first anchor entity is in the invalid state, and the terminal cannot determine its own position by means of the first anchor entity, or the accuracy of the position information determined by the terminal through the first anchor entity is lower than the threshold.

Based on this, when the first timer expires, the terminal may autonomously select the second anchor entity. The autonomous selection of the terminal may be performed by the terminal based on the set selection policy. Specifically, the selection policy may be set by the terminal or configured by the network device for the terminal. The present disclosure does not limit this.

Like the first anchor entity, the second anchor entity may also be used to transmit the PRS.

Specifically, after determining the second anchor entity, the terminal may determine its own position based on the PRS transmitted by the second anchor entity.

In summary, the embodiments of the present disclosure provide four optional implementations for reconfiguring the second anchor entity, which are used for the terminal to redetermine the available anchor entity.

In addition, the four implementations for reconfiguring the second anchor entity given in the embodiments of the present disclosure may be arbitrarily combined with the above three implementations for determining the first anchor entity. For example, the terminal autonomously selects the first anchor entity, measures the PRS transmitted by the first anchor entity to obtain the measurement information for positioning, and autonomously selects the second anchor entity after the measurement information satisfies the trigger event; and for another example, the terminal determines the first anchor entity based on the second anchor entity list configured by the network device and requests the network device to reconfigure the second anchor entity when the first timer expires.

Alternatively, the four implementations for reconfiguring the second anchor entity given in the embodiments of the present disclosure may be arbitrarily combined with the above two implementations for determining the first positioning scheme. For example, the terminal measures the PRS transmitted by the first anchor entity to obtain the measurement information for positioning, autonomously selects the second anchor entity after the measurement information satisfies the trigger event and the first positioning scheme; and for another example, the terminal requests the network device to reconfigure the second anchor entity and the first positioning scheme when the first timer expires.

In an optional embodiment, after the second anchor entity is reconfigured, the second anchor entity and the first positioning scheme may be used to achieve the positioning of the terminal; in another optional implementation scenario, after the second anchor entity is reconfigured, a second positioning scheme needs to be selected to implement the positioning of the terminal; and in another optional implementation scenario, the first anchor entity and the second positioning scheme may also be used to position the terminal. In addition, at this time, the second positioning scheme also needs to be selected.

Based on this, when the second positioning scheme needs to be determined, the embodiments of the present disclosure provide at least two optional implementations as follows.

In implementation 1, a second timer is configured by the network device for the terminal. When the second timer expires, the terminal determines the second positioning scheme.

Here, the second timer is configured to indicate an available duration or an valid duration of the first positioning scheme. In this case, implementation 1 may be one of: a first implementation in which when the second timer expires, the terminal requesting the network device to reconfigure the second positioning scheme; and a second implementation in which when the second timer expires, the terminal autonomously selects the second positioning scheme.

In implementation 2, the terminal autonomously selects the second positioning scheme based on a type and a number of the first anchor entity or the second anchor entity.

Exemplarily, when the terminal needs to implement its own positioning by means of the second anchor entity and the second positioning scheme, various implementations for determining the second positioning scheme provided in the embodiments of the present disclosure may be arbitrarily combined with the above four implementations for determining the second anchor entity, to realize the positioning of the terminal, which is not limited in the present disclosure. Specifically, the determination of the second anchor entity and the determination of the second positioning scheme may be completed concurrently or progressively. For the description of the specific steps, reference may be made to the aforementioned content, and details are omitted herein.

The following describes the above two implementations.

In implementation 1, when the second timer expires, the terminal determines the second positioning scheme.

Figure 14:
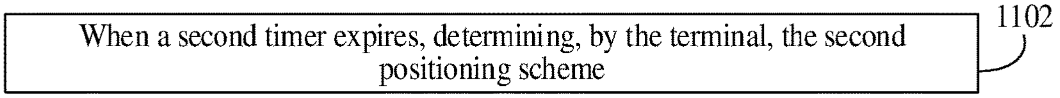
FIG. 14 is a flowchart of a positioning method according to an exemplary embodiment of the present disclosure.

FIG. 14 shows a flowchart of a positioning method according to an exemplary embodiment of the present disclosure. The positioning method is applied in the communication system illustrated in FIG. 1. The communication system includes the terminal. The positioning method provided in the embodiment of the present disclosure includes actions as follows.

At block 1102, when the second timer expires, the terminal determines the second positioning scheme.

Exemplarily, the second positioning scheme includes at least one of: the network-assisted global navigation satellite system method; the LTE signal-based time difference of arrival positioning; the LTE signal-based enhanced cell identification method; the wireless local area network positioning; the Bluetooth positioning; the TBS positioning; the sensor-based method including the air pressure sensor and the motion sensor; the NR signal-based NRe-CID; the multi-RTT positioning; the NR signal-based DL-AoD; the NR signal-based DL-TDOA; the NR signal-based UL-TDOA; and the UL-AoA.

As described above, the second timer is configured to indicate the available duration or the valid duration of the first positioning scheme. That the second timer expires means that the available duration or valid duration of the first positioning scheme is exceeded, i.e., the terminal cannot determine its own position by means of the first positioning scheme when the second timer expires, or accuracy of position information determined by the terminal through the first positioning scheme is lower than the threshold.

Based on this, when the second timer expires, the terminal needs to reselect one positioning scheme to position itself by combining with the first anchor entity or the second anchor entity.

According to the foregoing, implementation 1 may be realized as one of the following two ways.

In a first implementation, when the second timer expires, the terminal requests the network device to reconfigure the second positioning scheme.

Figure 15:
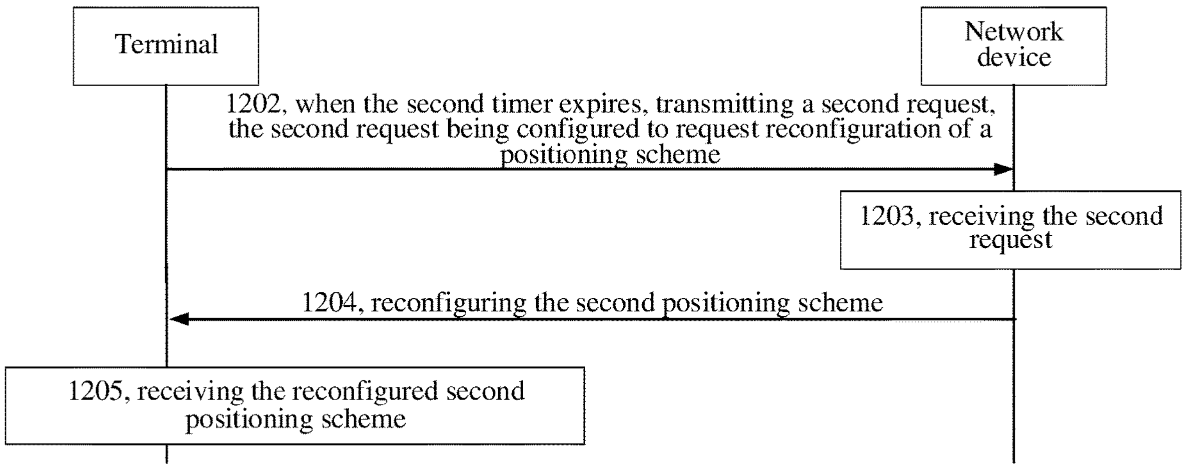
FIG. 15 is a flowchart of a positioning method according to an exemplary embodiment of the present disclosure.

FIG. 15 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 1202, when the second timer expires, the terminal transmits a second request to the network device.

Exemplarily, the second request is used to request a reconfiguration positioning scheme.

At block 1203, the network device receives the second request.

According to the foregoing, when the second timer expires, an available positioning scheme needs to be redetermined; and on this basis, as block 1202, the network device can receive the second request transmitted by the terminal.

At block 1204, the network device reconfigures the second positioning scheme to the terminal.

Specifically, since the second request is used for requesting the reconfiguration of the positioning scheme, after receiving the second request transmitted by the terminal, the network device determines one or more available positioning schemes according to the requirements of the terminal or the selection policy, and reconfigures the one or more available positioning schemes to the terminal.

At block 1205, the terminal receives the second positioning scheme configured by the network device.

Specifically, according to block 1204, since the network device configures the second positioning scheme for the terminal, the terminal may obtain the second positioning scheme configured by the network device. Subsequently, the terminal may implement its own positioning in conjunction with the first anchor entity or the second anchor entity.

Optionally, the determination of the first anchor entity or the reconfiguration of the second anchor entity may be performed simultaneously or progressively with the configuration of the second positioning scheme. The specific steps of determining the first anchor entity or reconfiguring the second anchor entity may refer to the above contents, and details are omitted herein.

Exemplarily, in the embodiments of the present disclosure, the step of the terminal may become an embodiment of the positioning method alone, and the step of the network device may also be solely an embodiment of the positioning method. For the elaborate depiction of the steps involved in the positioning method, please refer to the following details, and details are omitted herein.

In the second implementation, when the second timer expires, the terminal autonomously selects the second positioning scheme.

Figure 16:
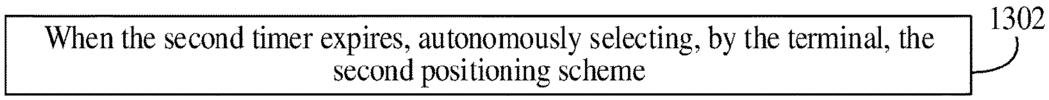
FIG. 16 is a flowchart of a positioning method according to an exemplary embodiment of the present disclosure.

FIG. 16 shows a flowchart of a positioning method according to an exemplary embodiment of the present disclosure. The positioning method is applied in the communication system illustrated in FIG. 1. The communication system includes the terminal and the network device. The positioning method provided in the embodiment of the present disclosure includes actions as follows.

At block 1302, when the second timer expires, the terminal autonomously selects the second positioning scheme.

Here, the autonomous selection of the terminal may be performed by the terminal based on the set selection policy. Specifically, the selection policy may be set by the terminal or configured by the network device for the terminal. The present disclosure does not limit this.

Exemplarily, a way for the terminal autonomously selecting the second positioning scheme may be implemented as: autonomously selecting, by the terminal, the second positioning scheme based on a type of and a number of the first anchor entity or the second anchor entity.

According to the foregoing, the anchor entity includes, but is not limited to, the at least one of: the network device, other terminals, and the RSU. Based on this, the type of the first anchor entity or the second anchor entity means that the first anchor entity or the second anchor entity belongs to the one of the network device, other terminals, and the RSU.

Here, the specific steps of determining the first anchor entity or reconfiguring the second anchor entity may refer to the previous contents; and the description of the second positioning scheme may refer to the foregoing, and details are omitted herein.

In implementation 2, the terminal autonomously selects the second positioning scheme based on the type and number of the first anchor entity or the second anchor entity.

Figure 17:
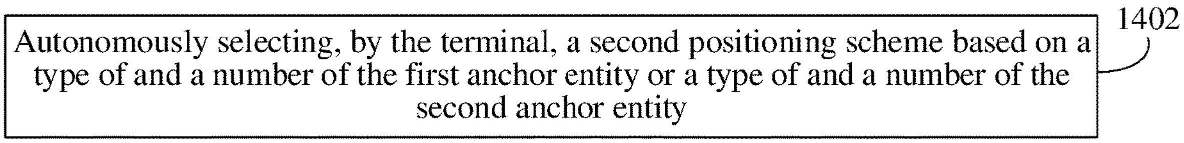
FIG. 17 is a flowchart of a positioning method according to an exemplary embodiment of the present disclosure.

FIG. 17 shows a flowchart of a positioning method according to an exemplary embodiment of the present disclosure. The positioning method is applied in the communication system illustrated in FIG. 1. The communication system includes the terminal. The positioning method provided in the embodiment of the present disclosure includes actions as follows.

At block 1402, the terminal autonomously selects the second positioning scheme based on the type and number of the first anchor entity or the second anchor entity.

According to the foregoing, the anchor entity includes, but is not limited to, the at least one of: the network device, other terminals, and the RSU. Based on this, the type of the first anchor entity or the second anchor entity means that the first anchor entity or the second anchor entity belongs to the one of the network device, other terminals, and the RSU.

Here, the specific steps of determining the first anchor entity or reconfiguring the second anchor entity may refer to the previous contents; and the description of the second positioning scheme may refer to the foregoing, and details are omitted herein.

Exemplarily, the autonomous selection of the terminal may be performed by the terminal based on the set selection policy. Specifically, the selection policy may be set by the terminal or configured by the network device for the terminal. The present disclosure does not limit this.

In conclusion, the embodiments of the present disclosure provide two optional implementations for determining the second positioning scheme, enabling the terminal to achieve positioning for itself through the first anchor entity and the first positioning scheme.

In addition, when the terminal needs to implement its own positioning by means of the second anchor entity and the second positioning scheme, various implementations for determining the second positioning scheme provided in the embodiments of the present disclosure may be arbitrarily combined with the above four implementations for determining the second anchor entity. For example, the network device reconfigures the second anchor entity based on the measurement information reported by the terminal and reconfigures the second positioning scheme for the terminal simultaneously; for another example, the terminal autonomously selects the second anchor entity when the measurement information satisfies the trigger condition and meanwhile autonomously selects the second positioning scheme when the second timer expires; and for another example, when the first timer expires, the network device reconfigures the second anchor entity for the terminal, and the terminal autonomously selects the second positioning scheme according to the type and number of the second anchor entity.

In addition, as described above, the present disclosure lists three implementations for determining the first anchor entity, two implementations for determining the first positioning scheme, four implementations for reconfiguring the second anchor entity, and two implementations for determining the second positioning scheme. Optionally, the above various implementations may be arbitrarily combined to realize the positioning of the terminal in an SL scenario, which is not limited herein.

For example, when the terminal is in the cell coverage of the network device and is in the RRC connected state, the terminal receives the first anchor entity configured by the network device; the terminal measures the PRS transmitted by the first anchor entity to obtain the measurement information for positioning, and reports the measurement information to the network device; and then, the network device reconfigures the second anchor entity and the positioning scheme for the terminal based on the measurement information.

For another example, when the terminal is in an RRC idle state or an RRC inactive state, the terminal autonomously selects the first anchor entity and the first positioning scheme; and the terminal measures the PRS transmitted by the first anchor entity to obtain the measurement information for positioning. Subsequently, when the measurement information satisfies the trigger event, the terminal autonomously selects the second anchor entity and selects the second positioning scheme based on the type and number of the second anchor entity.

For another example, when the terminal is within the cell coverage of the network device and is in the RRC connected state, the terminal receives the anchor entity list configured by the network device and autonomously selects the first anchor entity. Meanwhile, when the first anchor entity fails to be autonomously selected, the terminal transmits a request to the network device. The request is used for reconfiguring the anchor entity list. Subsequently, the terminal selects the first positioning scheme according to the type and number of the first anchor entity.

In addition, the first anchor entity, the first positioning scheme, the second anchor entity, and the second positioning scheme provided by the present disclosure may also have other diverse optional combination modes, which are not listed here exhaustively.

The following is an apparatus embodiment of the present disclosure. For details not elaborated in the apparatus embodiment, reference may be made to the corresponding descriptions in the above method embodiments, and details thereof will be omitted here.

Figure 18:
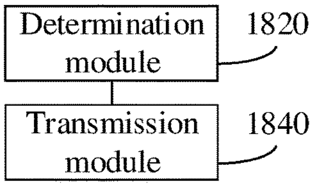
FIG. 18 is a schematic structural diagram of a positioning apparatus according to an exemplary embodiment of the present disclosure.

FIG. 18 is a schematic structural diagram of a positioning apparatus according to an exemplary embodiment of the present disclosure. The positioning apparatus may be implemented as a terminal or a part of the terminal. The positioning apparatus includes a determination module 1820 configured to determine a first anchor entity, the first anchor entity being configured to transmit a PRS.

In an optional embodiment, the determination module 1820 is configured to receive a first anchor entity configured by a network device.

In an optional embodiment, the determination module 1820 is configured to receive, when the terminal is within a cell coverage of the network device and in a radio resource control (RRC) connected state, the first anchor entity configured by the network device.

In an optional embodiment, the determination module 1820 is configured to select autonomously the first anchor entity.

In an optional embodiment, the determination module 1820 is configured to: select autonomously, when the terminal is outside a cell coverage of a network device, the first anchor entity; or select autonomously, when the terminal is in an RRC idle state or an RRC inactive state, the first anchor entity.

In an optional embodiment, the determination module 1820 is configured to receive a first anchor entity list configured by a network device. The first anchor entity list includes at least one first candidate anchor entity; the positioning apparatus further includes a transmission module 1840 configured to measure anchor information of the first candidate anchor entity and report the anchor information of the first candidate anchor entity to the network device; and the determination module 1820 is configured to receive a second anchor entity list configured by the network device, the second anchor entity list including at least one second candidate anchor entity; and determine the first anchor entity from the at least one second candidate anchor entity.

In an optional embodiment, the anchor information of the first candidate anchor entity includes at least one of: a type of the first candidate anchor entity; an identifier of the first candidate anchor entity; a movement direction of the first candidate anchor entity; a movement speed of the first candidate anchor entity; a reference signal received power (RSRP) measurement value of the first candidate anchor entity; a reference signal receiving quality (RSRQ) measurement value of the first candidate anchor entity; and a relative speed between the terminal and the first candidate anchor entity.

In an optional embodiment, the transmission module 1840 is further configured to measure the PRS transmitted by the first anchor entity to obtain measurement information for positioning; report the measurement information to the network device; and receive a second anchor entity reconfigured by the network device; or, the determination module 1820 is further configured to measure the PRS transmitted by the first anchor entity to obtain the measurement information for positioning; and when the measurement information satisfies a trigger event, autonomously select the second anchor entity; or the transmission module 1840 is further configured to transmit, when a first timer expires, a first request to the network device, the first request being configured to request reconfiguration of an anchor entity; and receive the second anchor entity reconfigured by the network device; or the determination module 1840 is configured to autonomously select, when the first timer expires, the second anchor entity.

In an optional embodiment, the measurement information includes at least one of: an RSRP measurement value of the first anchor entity; an RSRQ measurement value of the first anchor entity; a relative speed between the terminal and the first anchor entity; a positioning source of the first anchor entity; a positioning source priority level of the first anchor entity; an identifier of an alternative anchor entity; an RSRP measurement value of the alternative anchor entity; an RSRQ measurement value of the alternative anchor entity; a relative speed between the terminal and the alternative anchor entity; a positioning source of the alternative anchor entity; and a positioning source priority level of the alternative anchor entity.

In an optional embodiment, the trigger event includes at least one of: an RSRP measurement value of the first anchor entity being smaller than an RSRP measurement threshold; an RSRQ measurement value of the first anchor entity being smaller than an RSRQ measurement threshold; a positioning source of the first anchor entity changing; a positioning priority level of the first anchor entity changing; a relative speed between the terminal and the first anchor entity exceeding a speed threshold; and an angle between a movement direction of the terminal and a movement direction of the first anchor entity being greater than a direction threshold.

In an optional embodiment, the determination module 1820 is further configured to: receive a first positioning scheme configured by the network device; or autonomously select the first positioning scheme based on a type of and a number of the first anchor entity.

In an optional embodiment, the determination module 1820 is further configured to determine, when a second timer expires, a second positioning scheme.

In an optional embodiment, the transmission module 1840 is further configured to: transmit, when the second timer expires, a second request to the network device, the second request being configured to request reconfiguration of a positioning scheme; and receive a second positioning scheme reconfigured by the network device; or the determination module 1820 is further configured to autonomously select, when the second timer expires, the second positioning scheme.

In an optional embodiment, the determination module 1820 is further configured to autonomously select a second positioning scheme based on a type of and a number of the second anchor entity.

In an optional embodiment, the transmission module 1840 is further configured to transmit, when the first anchor entity fails to be autonomously selected, a third request to a network device. The third request is configured to reconfigure the second anchor entity list.

Figure 19:
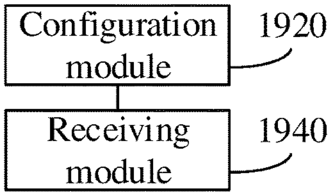
FIG. 19 is a schematic structural diagram of a positioning apparatus according to an exemplary embodiment of the present disclosure.

FIG. 19 is a schematic structural diagram of a positioning apparatus according to an exemplary embodiment of the present disclosure. The positioning apparatus may be implemented as a network device or a part of the network device. The positioning apparatus includes a configuration module 1920 configured to: configure a first anchor entity to a terminal, the first anchor entity being configured to transmit a PRS; or configure a first anchor entity list to the terminal, the first anchor entity list including at least one first candidate anchor entity; receive anchor information of the first candidate anchor entity reported by the terminal, the anchor information of the first candidate anchor entity being measured by the terminal; and configure a second anchor entity list to the terminal, the second anchor entity list including at least one second candidate anchor entity for determining the first anchor entity.

In an optional embodiment, the configuration module 1920 is configured to configure, when the terminal is within a cell coverage of the network device and in an RRC connected state, the first anchor entity to the terminal.

In an optional embodiment, the anchor information of the first candidate anchor entity includes at least one of: a type of the first candidate anchor entity; an identifier of the first candidate anchor entity; a movement direction of the first candidate anchor entity; a movement speed of the first candidate anchor entity; an RSRP measurement value of the first candidate anchor entity; an RSRQ measurement value of the first candidate anchor entity; and a relative speed between the terminal and the first candidate anchor entity.

In an optional embodiment, the positioning apparatus further includes a receiving module 1940 configured to receive measurement information reported by the terminal for positioning, the measurement information being obtained by measuring, by the terminal, the PRS transmitted by the first anchor entity; and the configuration module 1920 configured to transmit a reconfigured second anchor entity to the terminal; or the receiving module 1940 configured to receive a first request transmitted by the terminal, the first request being transmitted by the terminal when a first timer expires and being configured to request reconfiguration of an anchor entity; and the configuration module 1920 configured to reconfigure, by the network device, the second anchor entity to the terminal.

In an optional embodiment, the measurement information includes at least one of: a RSRP measurement value of the first anchor entity; a RSRQ measurement value of the first anchor entity; a relative speed between the terminal and the first anchor entity; a positioning source of the first anchor entity; a positioning source priority level of the first anchor entity; an identifier of an alternative anchor entity; an RSRP measurement value of the alternative anchor entity; an RSRQ measurement value of the alternative anchor entity; a relative speed between the terminal and the alternative anchor entity; a positioning source of the alternative anchor entity; and a positioning source priority level of the alternative anchor entity.

In an optional embodiment, the configuration module 1920 is further configured to configure a first positioning scheme for the terminal.

In an optional embodiment, the receiving module 1940 is configured to receive a second request transmitted by the terminal, the second request being transmitted by the terminal when a second timer expires, the second request being configured to request reconfiguration of a positioning scheme; and the configuration module 1920 configured to reconfigure a second positioning scheme to the terminal.

In an optional embodiment, the receiving module 1940 is further configured to receive a third request transmitted by the terminal. The third request is transmitted by the terminal when a second anchor entity fails to be re-selected and is configured to reconfigure the second anchor entity list.

Exemplarily, the embodiments of the present disclosure further provide a terminal. The terminal includes: a processor; and a memory storing at least one program code therein. The at least one program code, when loaded and executed by the processor, implements any one of the positioning method as described above.

Exemplarily, the embodiments of the present disclosure further provide a computer device. The computer device includes: a processor; and a memory storing at least one program code therein. The at least one program code, when loaded and executed by the processor, implements any one of the positioning method as described above.

Exemplarily, the embodiments of the present disclosure further provide a chip. The chip includes a programmable logic circuit and/or program instructions. The chip, when running, is configured to implement any one of the positioning method as described above.

Exemplarily, the embodiments of the present disclosure further provide a computer-readable storage medium. The computer-readable storage medium stores at least one program code therein. The at least one program code, when loaded and executed by a processor, implements any one of the positioning method as described above.

Figure 20:
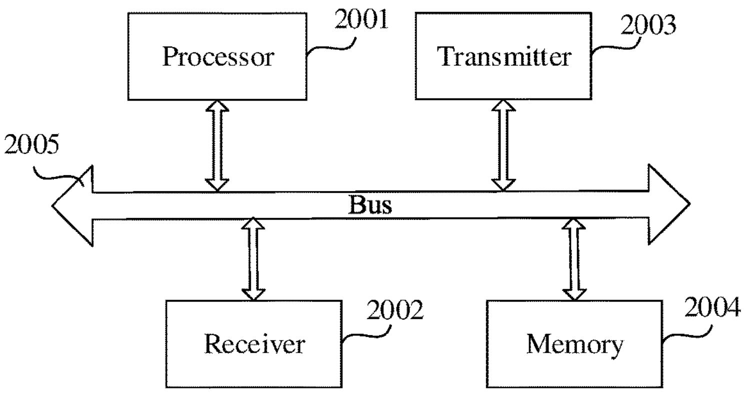
FIG. 20 is a schematic structural diagram of a communication device according to an exemplary embodiment of the present disclosure.

FIG. 20 shows a schematic structural diagram of a communication device (a terminal or a network device) according to an exemplary embodiment of the present disclosure. The communication device includes: a processor 2001, a receiver 2002, a transmitter 2003, a memory 2004, and a bus 2005.

The processor 2001 includes one or more processing cores and executes various functional applications and information processing by running a software program and module.

The receiver 2002 and the transmitter 2003 may be implemented as a communication component that may be a communication chip.

The memory 2004 is connected to the processor 2001 through the bus 2005.

The memory 2004 may be configured to store at least one instruction, and the processor 2001 is configured to execute the at least one instruction to implement various steps of the method for determining the RAR receiving window mentioned in the above method embodiments.

In addition, the memory 804 may be realized by any type of volatile or non-volatile storage devices, or a combination thereof. The volatile or non-volatile storage devices include, but are not limited to: a disk or an optical disk, an electrically-erasable programmable read only memory (EEPROM), an erasable programmable read only memory (EPROM), a static random access memory (SRAM), a read only memory (ROM), a magnetic memory, a flash memory, a programmable read only memory (PROM).

While the optional embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A positioning method, comprising:

determining, by a terminal, a first anchor entity for transmitting a positioning reference signal (PRS);

wherein said determining, by the terminal, the first anchor entity comprises:

receiving, by the terminal, a first anchor entity list configured by a network device, the first anchor entity list comprising one or more first candidate anchor entities;

measuring, by the terminal, anchor information of the one or more first candidate anchor entities;

reporting, by the terminal, the anchor information of the one or more first candidate anchor entities to the network device;

receiving, by the terminal, a second anchor entity list configured by the network device, the second anchor entity list comprising one or more second candidate anchor entities; and determining, by the terminal, the first anchor entity from the one or more second candidate anchor entities.

2. The method according to claim 1, wherein the anchor information of the one or more first candidate anchor entities comprises at least one of:

a type of each of the one or more first candidate anchor entities;

an identifier of each of the one or more first candidate anchor entities;

a movement direction of each of the one or more first candidate anchor entities;

a movement speed of each of the one or more first candidate anchor entities;

a reference signal received power (RSRP) measurement value of each of the one or more first candidate anchor entities;

a reference signal receiving quality (RSRQ) measurement value of each of the first one or more candidate anchor entities; and a relative speed between the terminal and each of the one or more first candidate anchor entities.

3. The method according to claim 1, further comprising:

measuring, by the terminal, the PRS transmitted by the first anchor entity to obtain measurement information for positioning; reporting, by the terminal, the measurement information to the network device; and receiving, by the terminal, a second anchor entity reconfigured by the network device; or measuring, by the terminal, the PRS transmitted by the first anchor entity to obtain the measurement information for positioning; and when the measurement information satisfies a trigger event, autonomously selecting, by the terminal, the second anchor entity; or when a first timer expires, transmitting, by the terminal, a first request to the network device, the first request being configured to request reconfiguration of an anchor entity; and receiving, by the terminal, the second anchor entity reconfigured by the network device; or when the first timer expires, autonomously selecting, by the terminal, the second anchor entity.

4. The method according to claim 3, wherein the measurement information comprises at least one of:

a reference signal received power (RSRP) measurement value of the first anchor entity;
a reference signal receiving quality (RSRQ) measurement value of the first anchor entity;
a relative speed between the terminal and the first anchor entity;
a positioning source of the first anchor entity;
a positioning source priority level of the first anchor entity;
an identifier of an alternative anchor entity;
an RSRP measurement value of the alternative anchor entity;
an RSRQ measurement value of the alternative anchor entity;
a relative speed between the terminal and the alternative anchor entity;
a positioning source of the alternative anchor entity; and
a positioning source priority level of the alternative anchor entity.

5. The method according to claim 1, further comprising:
receiving, by the terminal, a first positioning scheme configured by the network device; or
selecting, by the terminal, a first positioning scheme autonomously.

6. The method according to claim 5, wherein selecting, by the terminal, a first positioning scheme autonomously comprises:
selecting, by the terminal, the first positioning scheme autonomously based on a type of and a number of the first anchor entity.

7. A network device, comprising:
a processor; and
a memory having at least one program code stored therein, wherein the at least one program code, when loaded and executed by the processor, implements a positioning method, comprising:
configuring, by the network device, a first anchor entity list to the terminal, the first anchor entity list comprising one or more first candidate anchor entities; receiving, by the network device, anchor information of the one or more first candidate anchor entities reported by the terminal, the anchor information of the first candidate anchor entity being measured by the terminal; and configuring, by the network device, a second anchor entity list to the terminal, the second anchor entity list comprising at least one second candidate anchor entity for determining the first anchor entity.

8. The network device according to claim 7, wherein the anchor information of the one or more first candidate anchor entities comprises at least one of:
a type of each of the one or more first candidate anchor entities;
an identifier of each of the one or more first candidate anchor entities;
a movement direction of each of the one or more first candidate anchor entities;
a movement speed of each of the one or more first candidate anchor entities;
a reference signal received power (RSRP) measurement value of each of the one or more first candidate anchor entities;
a reference signal receiving quality (RSRQ) measurement value of each of the one or more first candidate anchor entities; and
a relative speed between the terminal and each of the one or more first candidate anchor entities.

9. The network device according to claim 7, wherein the method further comprises:
receiving, by the network device, measurement information reported by the terminal for positioning, the measurement information being obtained by the terminal measuring the PRS transmitted by the first anchor entity; and transmitting, by the network device, a reconfigured second anchor entity to the terminal; or
receiving, by the network device, a first request transmitted by the terminal, the first request being transmitted by the terminal when a first timer expires and being configured to request reconfiguration of an anchor entity; and reconfiguring, by the network device, the second anchor entity to the terminal.

10. The network device according to claim 9, wherein the measurement information comprises at least one of:
a reference signal received power (RSRP) measurement value of the first anchor entity;
a reference signal receiving quality (RSRQ) measurement value of the first anchor entity;
a relative speed between the terminal and the first anchor entity;
a positioning source of the first anchor entity;
a positioning source priority level of the first anchor entity;
an identifier of an alternative anchor entity;
an RSRP measurement value of the alternative anchor entity;
an RSRQ measurement value of the alternative anchor entity;
a relative speed between the terminal and the alternative anchor entity;
a positioning source of the alternative anchor entity; and
a positioning source priority level of the alternative anchor entity.

11. The network device according to claim 7, wherein the method further comprises:
configuring, by the network device, a first positioning scheme to the terminal.

12. A terminal, comprising:
a processor; and
a memory having at least one program code stored therein, wherein the at least one program code, when loaded and executed by the processor, implements a positioning method, comprising:
determining, by the terminal, a first anchor entity for transmitting a positioning reference signal (PRS);
wherein said determining, by the terminal, the first anchor entity comprises:
receiving, by the terminal, a first anchor entity list configured by a network device, the first anchor entity list comprising one or more first candidate anchor entities;
measuring, by the terminal, anchor information of the one or more first candidate anchor entities;
reporting, by the terminal, the anchor information of the one or more first candidate anchor entities to the network device;
receiving, by the terminal, a second anchor entity list configured by the network device, the second anchor entity list comprising one or more second candidate anchor entities;
determining, by the terminal, the first anchor entity from the one or more second candidate anchor entities.

13. The terminal according to claim 12, wherein the anchor information of the one or more first candidate anchor entities comprises at least one of:

a type of each of the one or more first candidate anchor entities;

an identifier of each of the one or more first candidate anchor entities;

a movement direction of each of the one or more first candidate anchor entities;

a movement speed of each of the one or more first candidate anchor entities;

a reference signal received power (RSRP) measurement value of each of the one or more first candidate anchor entities;

a reference signal receiving quality (RSRQ) measurement value of each of the one or more first candidate anchor entities; and a relative speed between the terminal and each of the one or more first candidate anchor entities.

14. The terminal according to claim 12, wherein the method further comprises:

measuring, by the terminal, the PRS transmitted by the first anchor entity to obtain measurement information for positioning; reporting, by the terminal, the measurement information to the network device; and receiving, by the terminal, a second anchor entity reconfigured by the network device; or measuring, by the terminal, the PRS transmitted by the first anchor entity to obtain the measurement information for positioning; and when the measurement information satisfies a trigger event, autonomously selecting, by the terminal, the second anchor entity; or when a first timer expires, transmitting, by the terminal, a first request to the network device, the first request being configured to request reconfiguration of an anchor entity; and receiving, by the terminal, the second anchor entity reconfigured by the network device; or when the first timer expires, autonomously selecting, by the terminal, the second anchor entity.

15. The terminal according to claim 14, wherein the measurement information comprises at least one of:

a reference signal received power (RSRP) measurement value of the first anchor entity;

a reference signal receiving quality (RSRQ) measurement value of the first anchor entity;

a relative speed between the terminal and the first anchor entity;

a positioning source of the first anchor entity;

a positioning source priority level of the first anchor entity;

an identifier of an alternative anchor entity;

an RSRP measurement value of the alternative anchor entity;

an RSRQ measurement value of the alternative anchor entity;

a relative speed between the terminal and the alternative anchor entity;

a positioning source of the alternative anchor entity; and a positioning source priority level of the alternative anchor entity.

16. The terminal according to claim 12, wherein the method further comprises:

receiving, by the terminal, a first positioning scheme configured by the network device; or selecting, by the terminal, a first positioning scheme autonomously.

17. The terminal according to claim 16, wherein selecting, by the terminal, a first positioning scheme autonomously comprises:

selecting, by the terminal, the first positioning scheme autonomously based on a type of and a number of the first anchor entity.

* * * * *